United States Patent
Lucidarme

(10) Patent No.: US 8,402,273 B2
(45) Date of Patent: Mar. 19, 2013

(54) METHOD FOR SECURING A TRANSMISSION, ASSOCIATED SYSTEM AND MEDIATION PLATFORM

(75) Inventor: Thierry Lucidarme, Montigny (FR)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 13/187,779

(22) Filed: Jul. 21, 2011

(65) Prior Publication Data

US 2011/0275310 A1  Nov. 10, 2011

Related U.S. Application Data

(63) Continuation of application No. 11/475,328, filed on Jun. 27, 2006, now Pat. No. 8,010,794.

(30) Foreign Application Priority Data

Jun. 28, 2005  (EP) ..................... 05291391

(51) Int. Cl.
*H04L 9/00* (2006.01)
(52) U.S. Cl. ........................................ 713/168
(58) Field of Classification Search .................. 713/168, 713/171; 380/200, 201, 112, 278; 725/62
See application file for complete search history.

(56) References Cited

U.S. PATENT DOCUMENTS

| 6,757,265 | B1 | 6/2004 | Sebastian et al. |
| 7,181,017 | B1 | 2/2007 | Nagel et al. |
| 7,477,743 | B2 | 1/2009 | Hakkarainen et al. |
| 2001/0026541 | A1 | 10/2001 | You et al. |
| 2003/0147532 | A1 | 8/2003 | Hakkarainen et al. |
| 2005/0004875 | A1 | 1/2005 | Kontio et al. |
| 2006/0064443 | A1 | 3/2006 | Duval |
| 2006/0115084 | A1 | 6/2006 | Ryu |

FOREIGN PATENT DOCUMENTS

| EP | 1739872 B1 | 5/2009 |
| GB | 2394862 A | 5/2004 |
| WO | 00/76251 A1 | 12/2000 |

OTHER PUBLICATIONS

European Broadcasting Union, ETSI EN 302 304 VI.I.I (Nov. 2004), European Standard (Telecommunications series), Digital Video Broadcasting (DVB-H); Transmission System for Handheld Terminals (DVB-H), pp. 1-14 (2004).
European Patent Application No. 05291391, European Search Report, pp. 1-3, Feb. 22, 2006.

*Primary Examiner* — Ellen Tran
(74) *Attorney, Agent, or Firm* — Meyertons, Hood, Kivlin, Kowert & Goetzel, P.C.

(57) ABSTRACT

In a system comprising a broadcasting subsystem and a radiocommunication subsystem each connected to a mediation platform, said transmission being ciphered and arranged for being deciphered by using a key, the following steps are performed at the mediation platform, relatively to a user or group of users having terminals: determining one first and at least one second sets of values from said key, so that the knowledge of all the determined sets of values is required to retrieve the key; and controlling the broadcasting subsystem so that it transmits the first set of values to the user or group of users and the radiocommunication subsystem so that it transmits the at least one second set of values to the user or group of users.

19 Claims, 4 Drawing Sheets

METHOD FOR SECURING A TRANSMISSION, ASSOCIATED SYSTEM AND MEDIATION PLATFORM

RELATED APPLICATION

This application is a continuation of U.S. patent application Ser. No. 11/475,328, filed Jun. 27, 2006, now U.S. Pat. No. 8,010,794.

BACKGROUND OF THE INVENTION

The present invention relates to secure transmission between a system and at least one user having a terminal.

It is very common to cipher transmission, so that only allowed receiving users, who have a specific key, can decipher the transmitted data.

Such ciphering can take place for instance, but of course not exclusively, in a broadcasting system, such as a DVB (Digital Video Broadcasting) network. The DVB system, and more particularly its DVB-H version adapted to handheld terminals, is fully described in the European standard EN 302 304, V1.1.1, "DVB (Digital Video Broadcasting); Transmission System for Handheld Terminals (DVB-H)", published by the ETSI (European Telecommunications Standards Institute) in November 2004.

FIG. 1 illustrates a DVB-H system in which a transmitter 1 multiplexes, through MUX 3, a plurality of streams $s_1$, $s_2, \ldots, s_n$, which can concern different services, e.g. a video service, a data service, an audio service, etc. Before being transmitted over a radio broadcasting channel 6 from an antenna 5, the resulting signal is multiplied by a ciphering key Kc (see multiplier 4).

A receiver 2 incorporated in a handheld terminal and listening to the channel 6 can get the ciphered signal through its antenna 7. If the user of the terminal is allowed to receive the services, he must have a deciphering key Kd capable of deciphering the signal. Such deciphering key can be a key dual to Kc, and can be public or private as well known by one skilled in the art. The signal resulting from the multiplication between the received signal and Kd (see multiplier 8) is finally demultiplexed by DEMUX 9 in order to obtain streams $r_1, r_2, \ldots, r_n$ substantially corresponding to the streams broadcasted by the transmitter 1. Further detail of the operations hold in transmitter 1 or receiver 2 is in conformity with the above-mentioned European standard EN 302 304.

Of course, ciphering can apply to all the streams as in FIG. 1, but it can also apply to some of the streams only. This can happen e.g. when the different streams correspond to different broadcasted TV channels, some of which are with charge for admission. In this case, only the users having a subscription for these channels should be provided with the corresponding deciphering key.

An easy way of providing the subscribers with deciphering key Kd is to send them a key K equal to Kd or from which Kd can be derived. However, when transmitting such key K over a radio channel, there is a risk that a hacker can listen to the transmission channel and intercept the key and then have access to the service without having a subscription.

In other respects, hybrid systems including a broadcasting subsystem and a radiocommunication subsystem are developing. For example, there are currently some efforts to propose hybrid systems combining a DVB subsystem and a cellular interactive communication subsystem, e.g. a GSM (Global System for Mobile communications), GPRS (General Packet Radio Service) or UMTS (Universal Mobile Telecommunication System) subsystem.

Such systems are of great interest because both subsystems have complementary advantages: DVB can transmit identical data to a large number of users with high data rates, whereas GSM or UMTS provides a return channel making the transmission interactive. Some terminals can be equipped to operate with both subsystems.

Although the hybrid systems offer improved services compared to the separate subsystems, such as video on demand or e-commerce applications, they do not resolve the above-mentioned problem, since the key used for deciphering the information sent from the DVB subsystem for instance is still transmitted over a radio channel which could be spied by hackers. Therefore, in hybrid systems, transmission of information is still subject to attacks.

An object of the present invention is to secure transmission in a hybrid system.

Another object of the invention is to limit the access to certain services to allowed users only in a hybrid system.

Another object of the invention is to limit the access to certain services to some areas only in a hybrid system.

SUMMARY OF THE INVENTION

The invention thus proposes a method for securing a transmission between a system and at least one user having a terminal, the system comprising a broadcasting subsystem and a radiocommunication subsystem each connected to a mediation platform, said transmission being ciphered and arranged for being deciphered by using a key. The method comprises the following steps performed at the mediation platform, relatively to a user or group of users having terminals:

determining one first and at least one second sets of values from said key, so that the knowledge of said first and at least one second sets of values is required to retrieve the key; and controlling the broadcasting subsystem so that it transmits the first set of values to the user or group of users and the radiocommunication subsystem so that it transmits the at least one second set of values to the user or group of users.

The splitting of the key and its transmission according to different paths make it more difficult for a hacker to intercept the key, since more than one channel must be listened to for retrieving the key. It is taken advantage of the fact that the hybrid system offers several channels to secure the transmission of the key.

Upon reception of every set of values, only the allowed users can retrieve the key and then decipher later transmission from the system.

If the radiocommunication subsystem includes a plurality of base stations, at least two second sets of values can be determined and transmitted from respective base stations to the user or group of users.

The number of base stations which can transmit sets of values to the user or group of users is advantageously indicated to the mediation platform, so that the latter can take it into account when determining the sets of values.

When this number of base stations is at least two, every set of values can be transmitted by radiocommunication subsystem, while no set of values would be transmitted by the broadcasting subsystem. Indeed, even in this case, there is a space diversity which makes it difficult for hackers to retrieve the key.

The number of values in each set of values can be identical or different. Particularly, it can depend on radio conditions encountered on the various radio channels involved.

In another embodiment, the radiocommunication subsystem transmits at least one second set of values only via at least one base station covering an area in which said transmission is allowed. This allows having a geographically restricted access for later transmission, since only the users present in said area can get the key necessary for deciphering.

The invention also proposes a mediation platform connecting a broadcasting subsystem and a radiocommunication subsystem of a system arranged for performing a transmission to at least one user having a terminal, said transmission being ciphered and arranged for being deciphered by using a key. The mediation platform comprises, relatively to a user or group of users having terminals:

means for determining one first and at least one second sets of values from said key, so that the knowledge of said first and at least one sets of values is required to retrieve the key; and means for controlling the broadcasting subsystem so that it transmits the first set of values to the user or group of users and the radiocommunication subsystem so that it transmits the at least one second set of values to the user or group of users The invention also proposes a system comprising a broadcasting subsystem and a radiocommunication subsystem each connected to a mediation platform, the system being arranged for transmitting to at least one user having a terminal, said transmission being ciphered and arranged for being deciphered by using a key. The system comprises means to implement the above-mentioned method, relatively to a user or group of users having terminals.

The invention also proposes a terminal comprising means for receiving a transmission from a system comprising a broadcasting subsystem and a radiocommunication subsystem each connected to a mediation platform, said transmission being ciphered, and means for deciphering said transmission by using a key. The terminal further comprises:

means for receiving one first set of values from the broadcasting subsystem;

means for receiving at least one second set of values from the radiocommunication subsystem; and means for retrieving said key from said first and at least one second sets of values.

DESCRIPTION OF PREFERRED EMBODIMENTS

Figure 1:
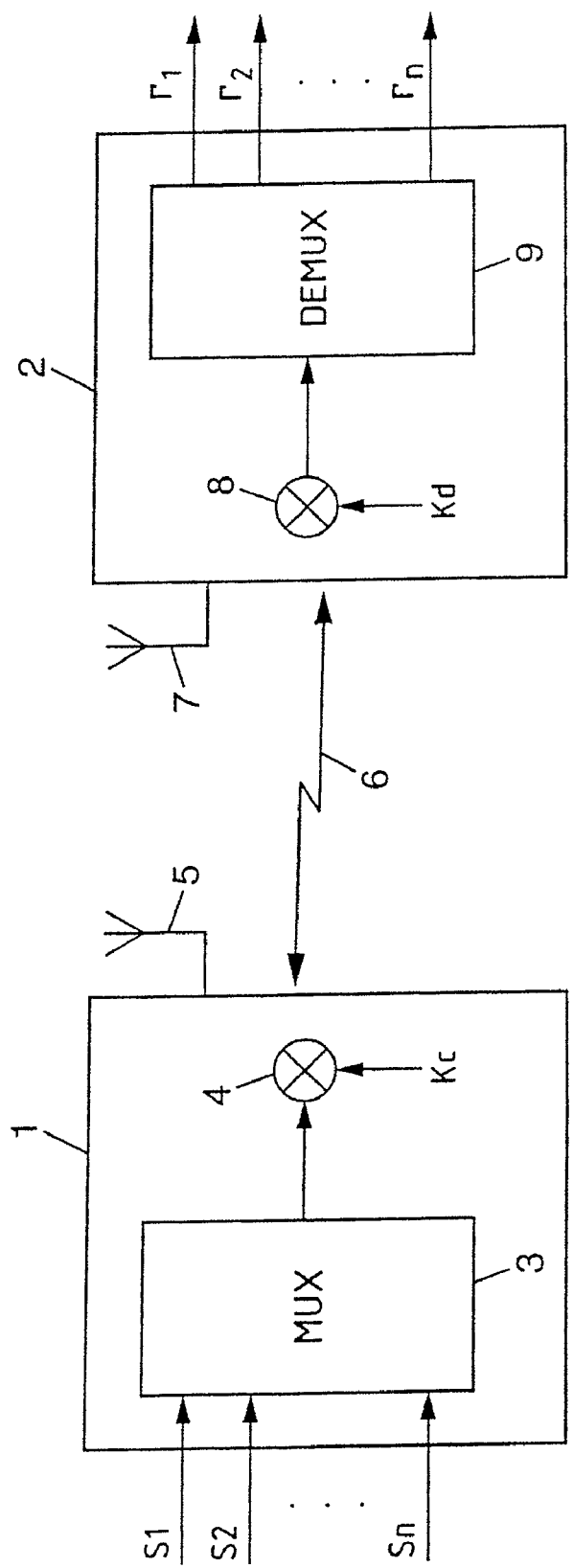
FIG. 1, already described, represents a transmission chain in a broadcasting system.
Figure 2:
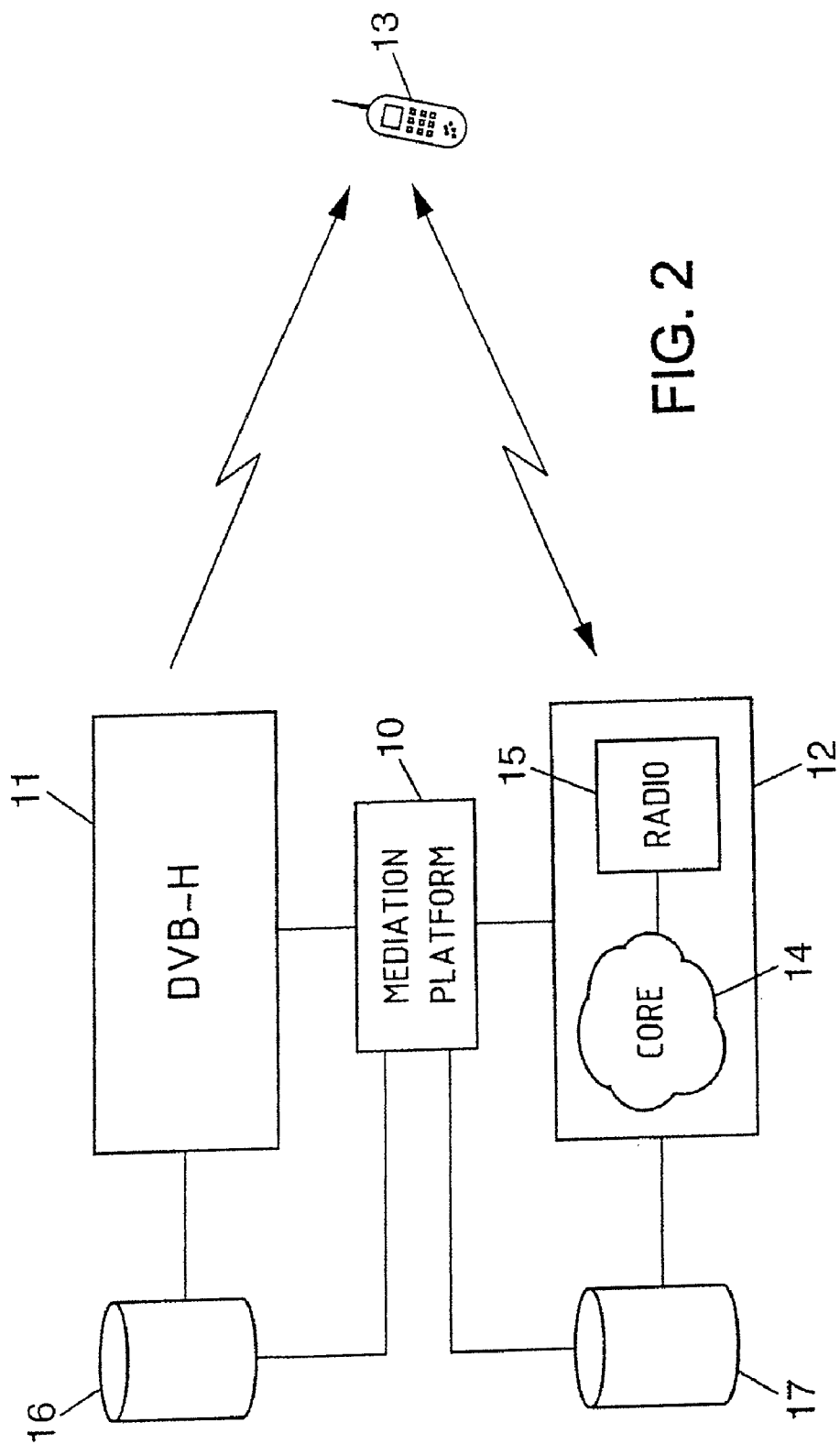
FIG. 2 is a schematic architecture example of a hybrid system according to the invention.

FIG. 2 shows an example of a hybrid system comprising a broadcasting subsystem 11, here a DVB-H subsystem, and a radiocommunication subsystem, here a cellular subsystem 12 e.g. GSM, GPRS or UMTS. The cellular subsystem 12 comprises a core part 14, including a mesh of switches or routers and a radio part 15 including base stations. A mediation platform 10 ensures a connection between both subsystems.

With this architecture, the system is capable of transmitting information from the DVB-H subsystem 11. In this case the information, which can be provided by a broadcast service provider 16 for instance, is generally broadcasted. The DVB-H subsystem 11 can also be able to transmit some information to a particular user or a group of users, such as the user having the mobile terminal 13.

The system is also capable of transmitting information from the cellular subsystem 12 to a user or a group of users. The transmitted information can come from a service provider 17 which can be the same or different from the broadcast service provider 16. The cellular subsystem 12 can also receive information from a user or a group of users. For example, the cellular subsystem 12 and the terminal 13 can exchange information in both directions.

The mediation platform 10 controls the transmission of both the DVB-H subsystem 11 and the cellular subsystem 12. It can also control the transmission from the service providers 16 and 17.

This architecture is suitable especially for providing an interactive broadcast service. For example, the user having the terminal 13 could request a video broadcasting from the cellular subsystem 12 through an uplink channel and this request could be processed by the mediation platform 10 which could then control the DVB-H subsystem 11 so that the user receives the requested video broadcasting through the broadcast channel provided by the DVB-H subsystem 11.

As for security aspects, some transmission from the DVB-H subsystem 11 can be ciphered. As explained above, the user 13 is capable of deciphering the transmitted information only if it has the adequate deciphering key, which can be a public or a private key, or a combination thereof. The ciphering/deciphering operations can be symmetrical or dissymmetrical as well known in the art.

As indicated above, the transmission, over a broadcast channel provided by the DVB-H subsystem 11, of a key K with which the broadcasted information can be deciphered would be too easy to intercept, since hackers would only have to listen to the broadcast channel and decode it if necessary.

In order to secure the transmission in the system, key K should be sent in a more secured way, so that only allowed users can get it.

Figure 3:
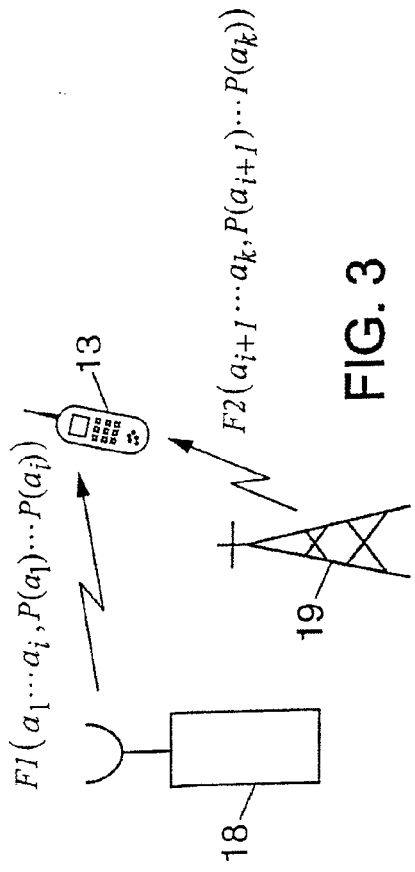
FIG. 3 schematically represents a key transmission in a simple system.

FIG. 3 illustrates a simple example of a secured transmission of K. In this example, key K must be sent to the user having the terminal 13 and who is an allowed user (e.g. because he has a subscription for a particular broadcast service). In this respect, the mediation platform of the system can maintain a list of the allowed users. Of course, key K could also be transmitted to a group of allowed users.

The terminal 13 can be reached by radio signals coming from one transmitter 18 of the DVB-H subsystem 11 and one transmitter of the cellular subsystem 12 which is part of a base station 19.

Key K is split into two sets of values, so that the knowledge of both sets of values is required to retrieve the key. And each one of the sets of values is sent by one of the transmitters 18 and 19. The splitting of key K can be of any type. It could simply be a division of the key consisting in a number N of bits into two parts, such as the N1 least significant bits and the N2 most significant bits of K, where N1+N2=N. It should be noted that N1 could be equal to N2 or different from it.

In a more sophisticated example, key K could be defined as a number k of coefficients of a polynomial P of degree k−1, where k is an integer. Lagrange interpolation theorem allows retrieving P when knowing k couples $(a_m, P(a_m))$, where $a_m$ represents an integer and $1 \leq m \leq k$.

This method is the one used in the example of FIG. 3, where the values $a_1, \ldots, a_i$ and $P(a_1), \ldots, P(a_i)$, with i<k, are transmitted to the terminal 13 from the DVB-H transmitter 18, whereas the values $a_{i+1}, \ldots, a_k$ and $P(a_{i+1}), \ldots, P(a_k)$ are transmitted to the terminal 13 from the base station 19. This splitting and distribution are done by the mediation platform which controls the transmission of both subsystems.

Upon reception of the 2k values $a_1, \ldots, a_k$ and $P(a_1), \ldots, P(a_k)$, the terminal 13 can retrieve the key K.

By contrast, a hacker cannot retrieve key K when listening only to the broadcast channel coming from the DVB-H transmitter 18 or to the radio channel coming from the base station 19. To intercept K, the hacker should thus monitor both channels, which is more difficult, especially because the channels use different paths in space and hackers usually spy channels with directive antennas pointed at one transmitter. Moreover, the DVB-H and cellular subsystems generally use different frequency bands, so that the quasi simultaneous reception of both channels by hackers is more complex.

To make the transmission of the sets of values more secured, the sets can be ciphered using respective private ciphering functions, like F1 and F2 in FIG. 3. Such functions can be Kasumi functions as well known and used in the UMTS system. Of course, any type of ciphering function can apply in this respect.

Figure 4:
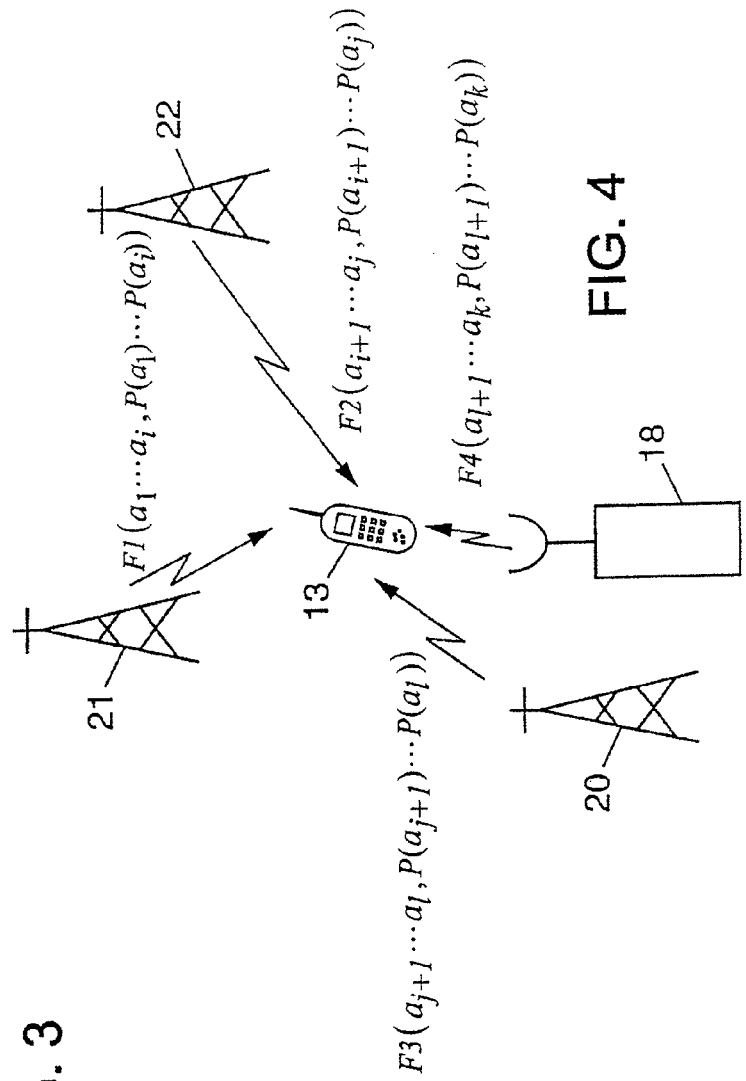
FIG. 4 schematically represents a key transmission in a more complex system.

FIG. 4 illustrates another embodiment of the present invention, in which the cellular subsystem is able to communicate with a terminal through several channels provided by different base stations at the same time. The three base stations 20-22 constitute an active set with which the terminal 13 can communicate.

In this case, the mediation platform of the system controls each one of the three base stations 20-22 as well as the DVB-H transmitter 18, so that they each transmit one set of values from which the key K can be retrieved. To this end, key K is split into four different sets of values, according to any splitting method as explained above. In the example shown in FIG. 4, each set of values correspond to a number of different values $a_m$ and the corresponding $P(a_m)$, where m is an integer such that $1 \leq m \leq k$ and P is a polynomial of degree k−1. The total number of different values $a_m$ transmitted equals k. As apparent in FIG. 4, each transmitted set of values can advantageously be ciphered with a respective private function F1-F4.

Each set of values can substantially have the same number of values. But it is also possible to have sets of values with different size. Advantageously, the number of values in each set depends on radio conditions on the corresponding channel. For example, if the downlink channel between the base station 20 and the terminal 13 encounters radio conditions not as good as the ones between the base stations 21-22 and the terminal 13, e.g. because there is more interference with it, it will transmit less values than the other ones. In other terms, with the references used in FIG. 4, we will thus have: l−j<i and also l−j<j−i.

The radio conditions on each channel can be measured by a radio controller of the radio part of the cellular subsystem, controlling the base stations 20-22. An indication of the measured conditions can be sent by the radio controller to the mediation platform of the system, so that it can take account of them in the key splitting operation.

The terminal 13 of FIG. 4 needs to receive the four different sets of values to retrieve key K and to be able to decipher later transmissions, e.g. from the DVB-H subsystem.

The high number of different transmitters involved in the transmission of the split key K makes it even more difficult for hackers to intercept the key.

Moreover, the base stations 20-22 will generally use different radio resource, such as different frequencies when FDMA (Frequency Division Multiple Access) is implemented or different codes when CDMA (Code Division Multiple Access) is implemented for instance. This also makes the task of hackers more complex.

The number of different transmitters involved should preferably be indicated to the mediation platform of the system, so that it can split key K in a appropriate number of sets of values and control the two subsystems accordingly for the transmission of the key. For the cellular subsystem, a radio controller can inform the mediation platform of the number of base stations from which sets of values can be transmitted to the terminal 13. Such radio controller can be a BSC (Base Station Controller) if the cellular subsystem is of the GSM type or a RNC (Radio Network Controller) if the cellular subsystem is of the UMTS type.

In a case different from the one illustrated in FIG. 4, when the mediation platform is informed that at least two base stations can transmit sets of values to the terminal, it can control the cellular subsystem so that it transmits every set of values from respective base stations, whereas the DVB-H transmitter transmits no set of values. In other terms, in the example of FIG. 4, the values $a_{i+1}, \ldots, a_k$ and $P(a_{i+1}), \ldots, P(a_k)$ could be transmitted by a further base station instead of the DVB-H transmitter 18, if the mediation platform of the system is informed that four base stations of the cellular subsystem can transmit sets of values to the terminal 13.

Figure 5:
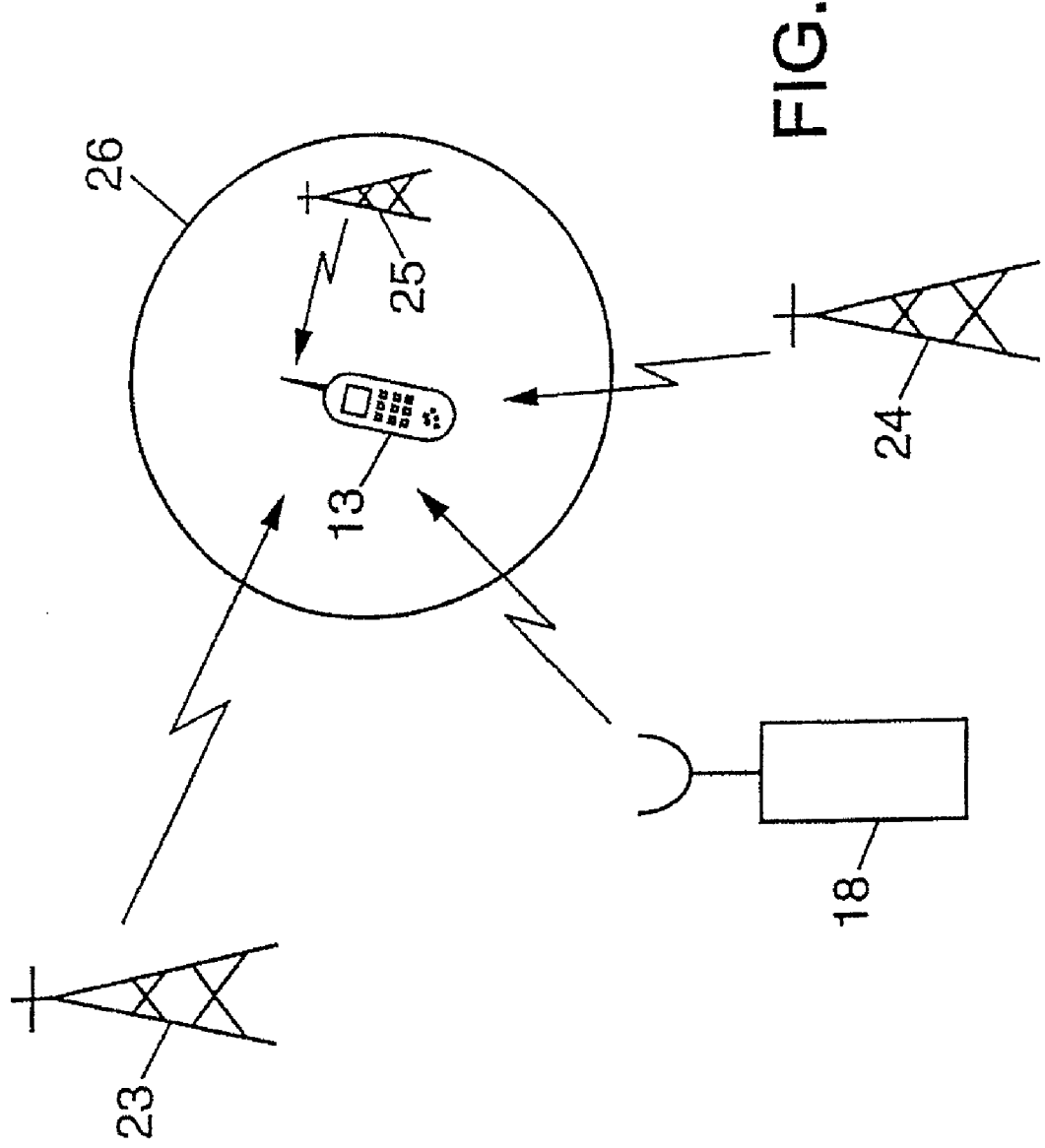
FIG. 5 schematically represents a key transmission in a more complex system with geographical restriction.

FIG. 5 illustrates a further embodiment of the present invention in which the access to a broadcasting service is limited not only to certain users but also to certain areas. As shown in FIG. 5, key K is split into four sets of values, one being transmitted from the DVB-H transmitter 18 and the three others from the base stations 23-25. The base station 25 covers a limited area. For example, its transmitter can have an indoor antenna, such that the covered area is a picocell 26.

The system is arranged so that only the base station 25 can transmit a particular set of values relating to key K. This implies that only the users present inside the picocell 26, like the user having the terminal 13, can receive said set of values and thus retrieve key K, since all sets of values are necessary for this. If the terminal 13 is outside the picocell 26, it will only receive the sets of values coming from the DVB-H transmitter 18 and the base stations 23-24 and thus will not be able to reconstruct key K. Further transmission from the system will thus not be deciphered by the terminal 13.

In the example described above, the radiocommunication subsystem was a cellular system. Of course, this is not exclusive. For instance, the radiocommunication subsystem could comprise a radio network of access points (APs), such as an Ad-hoc network. The access points are thus capable of providing a terminal communication node with different sets of values split in flows according to different routes, by using a layer 3 routing protocol such as MPLS ("Multi Protocol Label Switching") for example.

The invention claimed is:

1. A communication terminal for use with a hybrid communication system comprising a broadcasting subsystem and a radiocommunication subsystem, the terminal comprising:
   a broadcasting subsystem interface operable to receive signals from the broadcasting subsystem;
   a radiocommunication subsystem interface operable to receive signals from the radiocommunication subsystem; and
   a processor operable to process signals received by the broadcasting subsystem interface and the radiocommunication subsystem interface; the broadcasting subsystem interface and the radiocommunication interface together being operable to receive at least one first value and at least one second value; and the processor being operable:
- to process the at least one first value and the at least one second value to determine at least one key; and
- to decipher at least one broadcast channel using the determined key.

2. The terminal of claim 1, wherein the at least one first value comprises a first set of values.

3. The terminal of claim 1, wherein the at least one second value comprises a second set of values.

4. The terminal of claim 3, wherein the radiocommunication interface is operable:
- to receive at least one value of the second set of values from a first base station of the radiocommunication subsystem; and to receive at least one other value of the second set of values from a second base station of the radiocommunication subsystem.

5. The terminal of claim 1, wherein:
the broadcasting subsystem interface is operable to receive the at least one first value from the broadcasting subsystem; and the radiocommunication subsystem interface is operable to receive the at least one second value from the radiocommunication subsystem.

6. The terminal of claim 1, wherein:
the radiocommunication subsystem interface is operable to receive the at least one first value from a first base station of the radiocommunication subsystem; and
the radiocommunication subsystem interface is operable to receive the at least one second value from a second base station of the radiocommunication subsystem.

7. The terminal of claim 1, wherein:
the radiocommunication subsystem interface is operable to receive the at least one first value from a first base station of the radiocommunication subsystem and to receive the at least one second value from a second base station of the radiocommunication subsystem when the terminal is in communication with at least the first and second base stations of the radiocommunication subsystem; and
the broadcasting subsystem interface is operable to receive the at least one first value and the radiocommunication subsystem interface is operable to receive the at least one second value when the terminal is not in communication with at least first and second base stations of the radiocommunication subsystem.

8. The terminal of claim 1, wherein the radiocommunication subsystem interface is operable to decipher the at least one second value.

9. The terminal of claim 1, wherein the broadcasting subsystem interface is operable to decipher the at least one first value.

10. The terminal of claim 6, wherein the radiocommunication subsystem interface is operable to decipher the at least one first value.

11. A method of operating a communication terminal for communication with a hybrid communication system comprising a broadcasting subsystem and a radiocommunication subsystem, the method comprising:
receiving at least one first value and at least one second value; and processing the at least one first value and the at least one second value to determine at least one key; and deciphering at least one broadcast channel using the determined key.

12. The method of claim 11, wherein the at least on first value comprises a first set of values.

13. The method of claim 11, wherein the at least one second value comprises a second set of values.

14. The method of claim 13, wherein receiving at least one first set of values and at least one second set of values comprises:
receiving at least one value of the second set of values from a first base station of the radiocommunication subsystem; and receiving at least one other value of the second set of values from a second base station of the radiocommunication subsystem.

15. The method of claim 11, wherein receiving at least one first value and at least one second value comprises:
receiving the at least one first value from the broadcasting subsystem; and receiving the at least one second value from the radiocommunication subsystem.

16. The method of claim 11, wherein receiving at least one first value and at least one second value comprises:
receiving the at least one first value from a first base station of the radiocommunication subsystem; and
receiving the at least one second value from a second base station of the radiocommunication subsystem.

17. The method of claim 11, wherein receiving the at least one first value and at least one second value comprises:
receiving the at least one first value from a first base station of the radiocommunication subsystem and receiving the at least one second value from a second base station of the radiocommunication subsystem when the terminal is in communication with at least the first and second base stations of the radiocommunication subsystem; and
receiving the at least one first value from the broadcasting subsystem and receiving the at least one second value from the radiocommunication subsystem when the terminal is not in communication with at least first and second base stations of the radiocommunication subsystem.

18. The method of claim 11, further comprising deciphering the at least one second value.

19. The method of claim 11, further comprising deciphering the at least one first value.

* * * * *